March 12, 1940.  C. F. ROBERTS, JR  2,193,741
BEE FEEDER
Filed Dec. 15, 1938
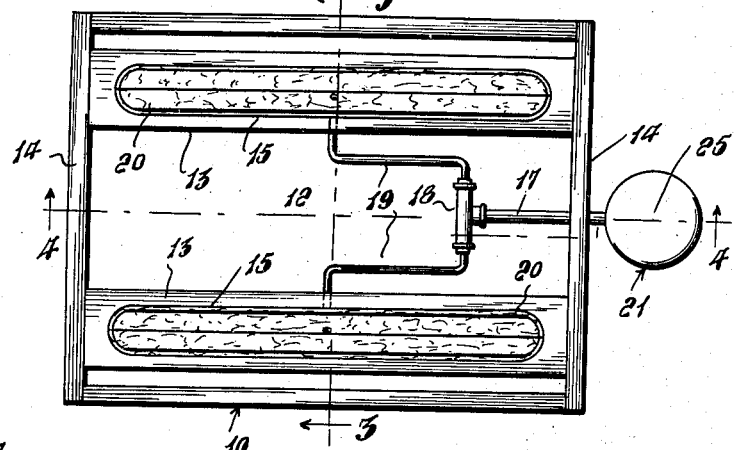
Fig. 1.
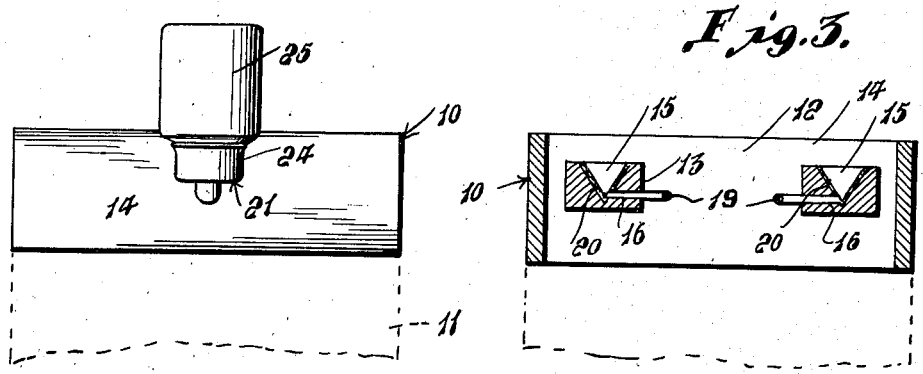
Fig. 2.
Fig. 3.
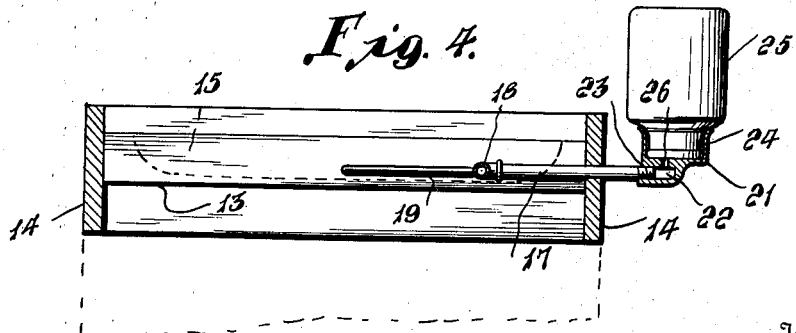
Fig. 4.
Inventor
Claude F. Roberts, Jr.
By L. F. Kaumush
Attorney Patented Mar. 12, 1940

2,193,741

UNITED STATES PATENT OFFICE 2,193,741

BEE FEEDER

Claude Franklin Roberts, Jr., Landis, N. C.

Application December 15, 1938, Serial No. 245,993

2 Claims. (Cl. 6—5)

This invention relates to an improved bee feeding attachment for bee hives.

It is an aim of this invention to provide a feeding attachment for bee hives adapted to be permanently disposed within the super of the hive and having refillable supply means disposed on the outer side of the hive for maintaining a predetermined quantity of liquid feed available at all times to the bees while within the hive and during the season when the device is in use.

More particularly, it is an object of this invention to provide a feeding attachment for hives adapted to be used during the season when it is difficult for the bees to secure sufficient food and which will be disposed in the super of the hive so that the bees may feed therefrom only while within the hive.

Still a further aim of the invention is to provide a feeder including troughs provided with strips of absorbent material adapted to be saturated with a liquid food furnished from a source of supply disposed on the outer side of the hive and by means of which said strips may be maintained in a saturated condition so that the food may be sucked therefrom by the bees with a minimum of waste.

Other objects and advantages of the invention will hereinafter become more fully apparent from the following description of the drawing, which illustrates a preferred embodiment thereof, and wherein:

Figure 1 is a top plan view of a super shown equipped with the feeding attachment, Figure 2 is a side elevational view showing the same super mounted on and forming a part of a bee hive, Figure 3 is a transverse vertical sectional view taken along the line 3—3 of Figure 1, and Figure 4 is a longitudinal vertical sectional view taken along the line 4—4 of Figure 1.

Referring more particularly to the drawing, wherein like reference characters designate like or corresponding parts throughout the different views, 10 designates a bee hive super adapted to be mounted on a brooder chamber, shown fragmentarily at 11, and adapted to support a cover not shown. The super 10 comprises a rectangular frame having an open interior 12 which is adapted to form a removable section of a bee hive and which is of conventional construction and shown merely to illustrate the application of the feeding attachment, comprising this invention, which will hereinafter be described.

The feeding attachment includes a pair of longitudinally disposed troughs 13 disposed longitudinally within the space 12 and connected at their ends to the ends 14 of the super 10. Troughs 13 are preferably formed from beams of wood the top sides of which are scooped out to provide the longitudinal V-shaped channels 15. Each of the troughs 13 are provided with the transverse bore 16 communicating with the bed of the channel 15, intermediate of its ends, and projecting inwardly therefrom to open toward the center of the interior 12.

A pipe 17 extends through one of the end walls 14 and is provided with a T-shaped joint 18 at its inner end. A pair of restricted branch pipes 19 are connected at their corresponding ends to the corresponding ends of the joint 18, said branch pipes having their free ends turned outwardly and extending into the bores 16 to open into the bottoms of the channels 15 of the troughs 13. The beds of the channels 15 are lined with strips of absorbent material 20 into which the branch pipes 19 open. A cup-shaped member, designated generally 21, is provided with a thickened bottom portion in which is formed a transverse bore 22 which is threaded at its open end to engage the opposite threaded end 23 of pipe 17. Member 21 is adapted to be connected to pipe 17 with its cup-shaped top portion 24 extending upwardly to receive and support the open neck or end of an inverted bottle or jar 25. The bottom of the cup portion 24 is provided with an opening 26 communicating with bore 22.

From the foregoing it will be seen that container 25, which is adapted to hold a supply of liquid feed, is disposed on the outer side of the super 10 so that it may be applied or removed without moving or interfering with the interior of the bee hive of which the super forms a part. The liquid feed from the container 25 flows through opening 26 into bore 22, through pipe 17 into joint 18, where it divides and flows through the two branch pipes 19 and into the bottoms of the two troughs 13 to maintain the strips 20 in a saturated condition so that the bees, while in the hive, may feed from the troughs 13 by sucking the feed from the strips 20. Opening 26 may vary in size depending upon the amount of feed to be dispensed, which will be substantially constant with hives of a given size. However, should the troughs 13 receive the feed faster than it is used up, when the liquid feed entirely covered the outlet ends of the branch pipes 19 the air supply there through to the container 25 would be shut off to thereby prevent further liquid from being dispensed from container 25 until air could again pass through pipes 19 and 17. If desired, the neck of the cup-shaped portion 24 could be provided with a rubber gasket on which the container 25 could seat to form an air tight connection to thereby prevent the container from being vented except through the pipes.

Various modifications and changes in the construction and arrangement of the parts forming the invention are contemplated and may obviously be resorted to, and the right is therefore expressly reserved to make such variations and changes as fall within the spirit and scope of the invention as hereinafter defined by the appended claims.

I claim as my invention:

1. An attachment for bee hives comprising a plurality of troughs disposed within a bee hive super, a pipe projecting through a side of said super, restricted branch pipes extending from one end of said pipe and opening into the bottoms of said troughs, the opposite end of the pipe being threaded, a cup-shaped member having a thickened bottom provided with a threaded bore to engage the threaded end of said pipe, an opening connecting said bore and the cup portion of said cup-shaped member, and an inverted feed container mounted in said cup-shaped member for supplying a liquid feed to said troughs.

2. A feeding attachment for bee hives comprising a plurality of troughs mounted in a bee hive super, said troughs being lined with an absorbent material, a pipe extending through a side of the super, branch pipes extending from the inner end of said pipe and opening into the bottoms of said troughs, a cup shaped member having a thickened bottom provided with a bore, said bore having an open end in threaded engagement with the outer end of said pipe, and an opening connecting the bore and cup portion of the cup shaped member, said cup portion being adapted to receive the open end of a liquid feed container for supporting the container in an inverted position.

CLAUDE FRANKLIN ROBERTS, Jr.